United States Patent [19]

Keith et al.

[11] 4,274,914

[45] Jun. 23, 1981

[54] FILTER MATERIAL

[75] Inventors: Charles H. Keith, Charlotte; Richard O. Tucker, Locust, both of N.C.

[73] Assignee: Celanese Corporation, New York, N.Y.

[21] Appl. No.: 84,004

[22] Filed: Oct. 11, 1979

Related U.S. Application Data

[63] Continuation of Ser. No. 937,228, Aug. 28, 1978, abandoned, which is a continuation of Ser. No. 730,039, Oct. 6, 1976, abandoned.

[51] Int. Cl.$^3$ .................. D21F 11/12; B01D 39/04
[52] U.S. Cl. .................. 162/109; 55/528; 162/117; 162/146
[58] Field of Search .......... 162/146, 157 C, 109, 162/117; 264/6, 11, 14, 187, 286; 210/500 R; 55/528, 527; 131/268

[56] References Cited

U.S. PATENT DOCUMENTS

| | | | |
|---|---|---|---|
| 2,999,788 | 9/1961 | Morgan | 162/157 R |
| 3,007,840 | 11/1961 | Wilcox | 162/157 C |
| 3,016,599 | 1/1962 | Perry | 162/157 C |
| 3,342,921 | 9/1967 | Brundige et al. | 162/157 C |
| 3,961,007 | 6/1976 | Caputi, Jr. et al. | 264/11 |
| 4,040,856 | 8/1977 | Litzinger | 162/157 C |

*Primary Examiner*—Peter Chin
*Attorney, Agent, or Firm*—Robert J. Blanke

[57] ABSTRACT

A non-woven cellulose ester fibrous filter sheet material comprising cellulose ester staple fibers and cellulose ester fibrets which exhibits improved filtration properties and the method of its preparation.

9 Claims, 5 Drawing Figures

FILTER MATERIAL

This is a continuation of application Ser. No. 937,228, filed Aug. 28, 1978, now abandoned, which is a continuation of application Ser. No. 730,039 filed Oct. 6, 1976, now abandoned.

The present invention relates to a sheet-like structure suitable for use as a filter material and more particularly to a sheet-like structure suitable for filtering tobacco smoke. It further relates to filters which will efficiently remove the harmful constituents of tobacco smoke, in particular tar and nicotine, without objectionably increasing the draw to a high level. The present invention also relates to processes for making such sheet-like structures and filters.

The principle use contemplated for the material of this invention is in a filter for removal of respirable particles of any kind as well as liquid filtration. When employed as a filter for the removal of respirable particles, the filter of this invention may be used in conjunction with cigarette or other smoking articles such as a pipe, cigar or cigarette or cigar holder. It will be obvious from the description which follows, however, that the filter material of this invention may also be advantageously utilized in surgical masks, for air filtration and in face masks for smog or dust protection.

Many types of filter materials have been proposed, particularly for decreasing the amount of harmful ingredients of tobacco smoke reaching a smoker's respiratory system. However, in addition to removing a high proportion of the harmful ingredients, a satisfactory filter must also function without unduly impeding the passage of air or smoke through the filter so as to result in too high a draw. When used in filtering tobacco smoke, the filter material must also not distort the taste of the tobacco smoke by adding a taste of its own. Another factor in the production of a satisfactory tobacco filter is that it must be capable of inexpensive fabrication so as not to make the ultimate price of the smoking article with which it is used too costly.

While a wide variety of fibrous materials have been conventionally employed as filter material, only wood pulp fibers and cellulose acetate have met with any significant commercial acceptance.

Wood pulp fibers are usually used in the form of a paper which is corrugated and/or condensed into a rod form for attachment to a cigarette while cellulose acetate is conventionally used in the form of a tow of substantially longitudinally extending continuous filaments which are preferably crimped to cause short sections of the individual filaments to run at random in non-parallel diverging and converging directions to the predominant longitudinal direction of the tow.

Conventional paper filters are generally characterized by higher filtration as measured by smoke removal efficiency, but also adversely affect taste and odor of the delivered smoke stream. Moreover, their phenol selectivity is significantly lower than that available when using conventional cellulose acetate tow filters. Further, paper filters are susceptible to collapse during smoking, primarily because of their tendency to absorb moisture from the tobacco smoke stream and smoker's mouth. Also, the compressibility of paper filters at a given pressure drop is generally greater than that of conventional tow filters of comparable weights.

In comparison with paper filters, conventional cellulose acetate tow filters overcome all the disadvantages of paper filters recited above while admirably meeting the requirements of good draw and economy. As a result, the major proportion of filter cigarettes now on the market utilize this type of material in spite of the fact that cellulose acetate tow filters exhibit smoke removal efficiencies at a given draw that are relatively lower than that of paper filters.

Many types of filters have been suggested to overcome this disadvantage while maintaining the advantages of cellulose acetate and thereby attaining a filter having the attributes of both filters in one filter which exhibits high smoke removal efficiencies and an acceptable draw. A commonly utilized concept to accomplish this end is the combination of cellulose acetate tow and paper in a single filter. This has been accomplished by the juxtaposition of a short rod of paper and a short rod of tow in what is commonly called a "dual filter". Such a filter tends to be quite expensive in comparison with conventional filter tip production since it necessitates the preparation of two distinct rods and their subsequent combination into a single filter. Alternatively, it has been suggested, as in U.S. Pat. No. 3,396,061, to merge a web of cellulose acetate tow and a paper web just prior to forming the filter. Combined paper/acetate filters are obtainable by this process at only a minor increase over the cost required to produce conventional filters. These filters are not considered entirely satisfactory, however, since there tends to be nonuniform distribution of the two filter materials across the cross section of the filter, an undesirable arrangement since tobacco smoke drawn through one portion of the filter will come in contact with only one filtration material while smoke drawn through another portion of the filter will come in contact with only the other filter material. As a result, no part of the smoke will be subjected to the filtration capabilities of both materials. Moreover, the distinctly undesirable taste produced by a paper filter is still present in a degree corresponding to the amount of paper utilized in the filter.

An alternate method of utilizing cellulose acetate staple fiber in a wholly cellulose acetate filter has been the orientation of fiber direction in the filter structure perpendicular to the flow of the material being filtered. Such fiber structures, however, whether in the form of nonwoven webs, felted batts or cylindrical rods lack dimensional stability and necessitates the use of a binder to maintain the filaments in a desired array. Moreover, such structures lack the efficiencies of standard paper filters because the surface area of staple fibers is below that of paper fibers. In addition, the use of binders presents further problems since they decrease the surface area available for filtration, add an undesirable taste to the filtered smoke and represent a limiting factor in the speed of filter manufacture because of the time necessary to attain complete bonding.

It is therefore an object of this invention to provide a sheet-like structure with stable fiber orientation having high surface area and having utility as a filter material.

It is a further object of this invention to provide a process for the preparation of materials suitable for being formulated into a high surface area binder-free sheet-like structure.

It is an additional object of this invention to provide a process for the preparation of a high surface area binder-free sheet-like structure with stable fiber orientation having utility as a filter material.

It is still another object of this invention to provide a high surface area filter rod subdividable into cigarette filters.

These and other objects of the invention will be more apparent from the following detailed description.

In accordance with this invention there is provided a high surface area cohesive, nonwoven cellulose ester fibrous sheet-like structure which maintains its fiber orientation in the absence of a binder and which exhibits high filtration efficiencies at an acceptable draw. This filter material comprises a web of cellulose ester staple fibers and from about 5 to about 35 percent, based on the weight of staple, of a voidy, high surface area, fibrillar cellulose ester material termed "fibrets".

The term "fibret" as employed herein identifies a high surface area, cellulose ester fibrillar material having surface areas in excess of 5.0 square meters per gram, lengths of less than 1000 microns and diameters of from about 0.5 to 50 microns.

The term "binder" as employed herein identifies non-solvent materials which have the ability to bond fibrous materials by forming a foreign interface on said fibrous materials. Specifically excluded from the definition of the term "binder" are substances which are partial solvents for the fibrous materials and which are more properly identified as plasticizers such as for instance triacetin, triethylene glycol diacetate and mixtures containing these and other plasticizer additives, i.e. polyethylene glycol and triacetin blends.

The phrase "high surface area" as employed herein identifies materials having a surface area in excess of one square meter per gram. Surface areas may be placed in proper perspective by noting that paper suitable for filter applications has a surface area of 1.2 to 3.2 square meters per gram while ¼ inch cellulose acetate staple having a denier per filament of 1.8, 3.0 and 8.0 has a surface area of 0.35, 0.26 and 0.20 square meters per gram respectively.

The staple employed in the preparation of the web is desirably cellulose ester staple fiber of the conventional type having a fiber length of from about ⅛ to ⅝ inch and a diameter per filament of from about 1.0 to 8.0. It is preferred that the staple have a length of from ¼ to ⅜ inch and a denier per filament of from about 1.0 to 3.0. The sheet-like material is wet-laid from an aqueous slurry of cellulose ester staple fibers and cellulose ester fibrets, the process employing conventional wet lay nonwoven apparatus. The sheet-like material preferably has a sheet weight of from 20 to 40 grams per square meter, a surface area in excess of 1 square meter per gram and a sheet breaking strength of from 200 to 1000 g/5 cm. The sheet-like material is preferably corrugated prior to being formed into cigarette rod material. The rod, when cut into lengths suitable for a tobacco smoke filter, exhibits a draw, measured as the air pressure drop across the filter, in the range of 30 to 200 millimeters of water at a flow of 17.5 ml/second for a 20 millimeter length of filter.

The invention may be more readily understood by reference to the drawings wherein.

Figure 1:
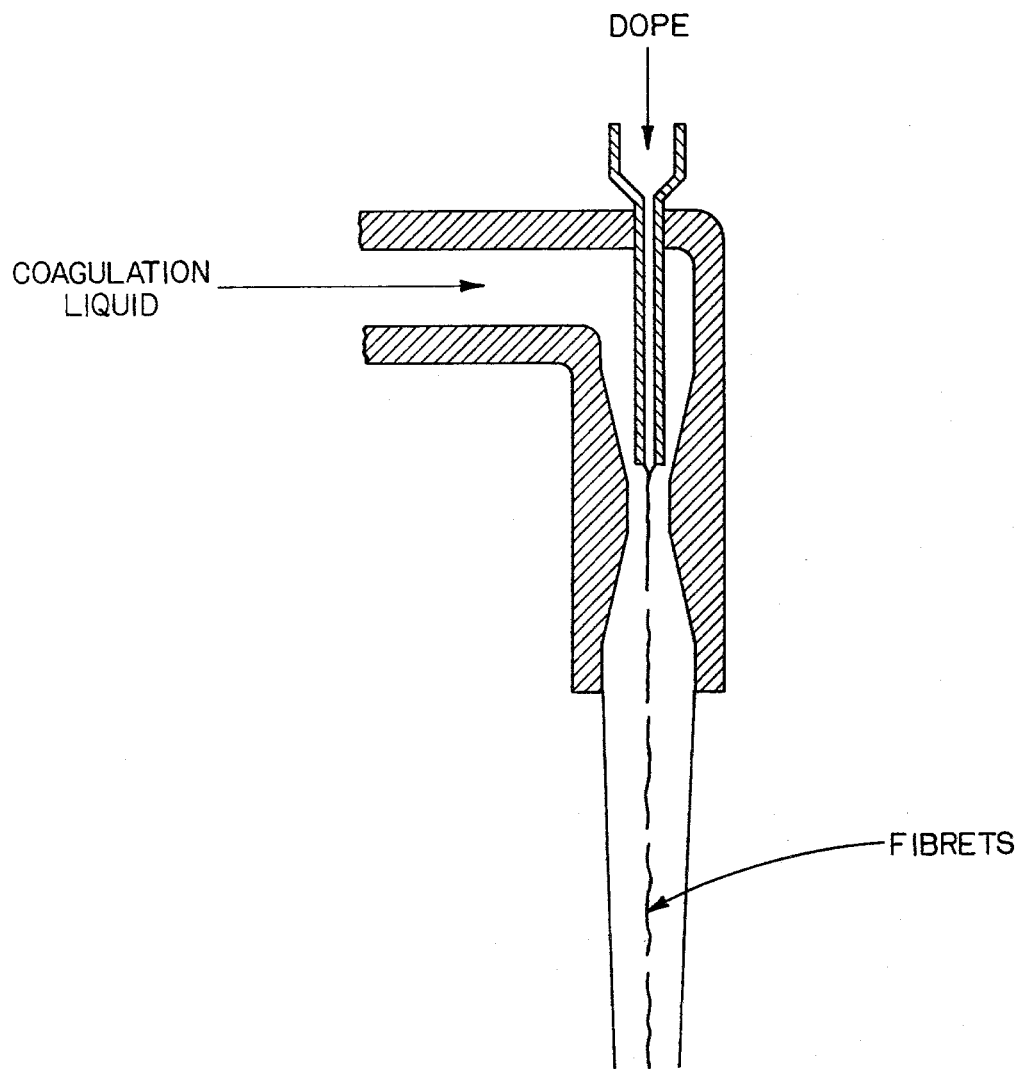
FIG. 1 is a schematic drawing of one system suitable for the preparation of fibrets suitable for use in this invention.
Figure 4:
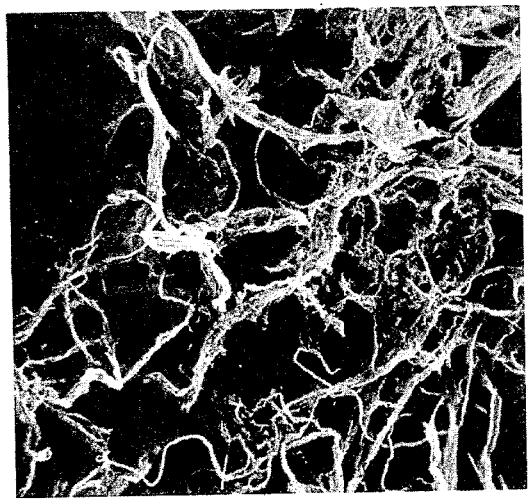
FIG. 4 is a photomicrograph of the cellulose acetate fibret of this invention.

Turning to FIG. 1, a schematic drawing is set forth illustrating the preparation of a highly fibrillated acetate fiber. As indicated in the drawing, a supply of cellulose acetate dissolved in acetone, or alternatively in acetic acid, is pumped through a capillary needle. The end of the needle is situated in the throat of a venturi tube through which a coagulation liquid, usually hot or cold water, is passed. The high velocity of the water stream in the throat region serves to attenuate the dope stream and additionally extracts the dope solvent, thereby forming a fibret. By changing the dope concentration, water flow, water temperature or by adding other solvents to the water stream, the size, degree of fibrillation and length of the fibret is controlled. Specific apparatus and processing conditions for preparing fibrets according to this method are set forth in Example 2 which follows. The apparatus of Example 2 is also a venturi type apparatus; however, the dope is extruded above the throat of the venturi. Representative of the fibrets obtained by said Example 2 are the fibrets illustrated in FIG. 4 of the drawings which is a photomicrograph magnified 600 times. Fibrets obtained by this process or by processes well known to the prior art may then be converted into a sheet-like material as set forth in FIG. 2 of the drawings.

Figure 2:
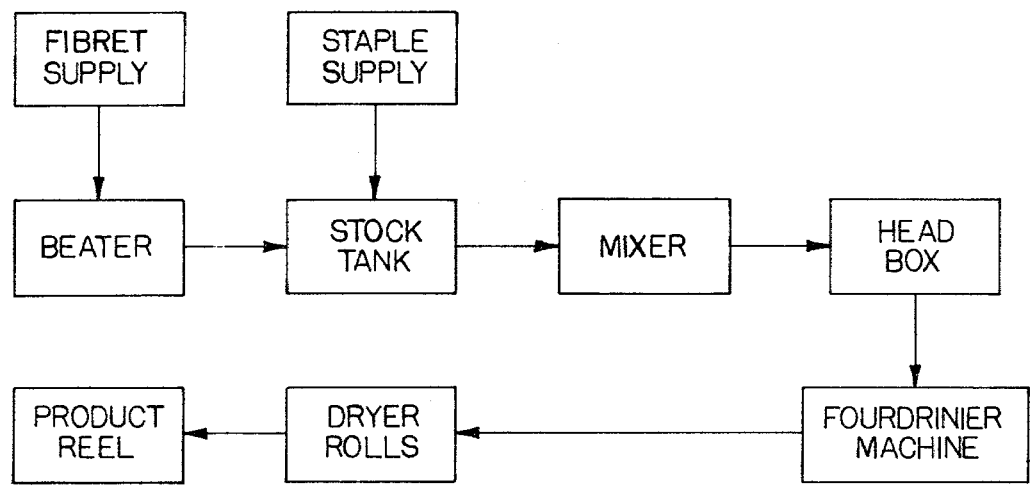
FIG. 2 is a flow sheet of a process for the preparation of the sheet-like structure of this invention.
Figure 5:
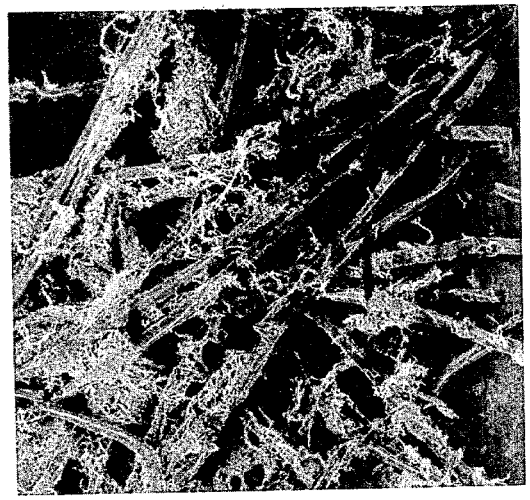
FIG. 5 is a photomicrograph of the sheet-like material of this invention.

In FIG. 2 of the drawings, a flow sheet is set forth which is illustrative of a typical process employing wet lay nonwoven machinery for the preparation of a sheet-like material of this invention. As can be seen from the flow sheet, a slurry of fibrets is fed from a fibret supply through a beater into a stock tank where a slurry of staple fiber is added from the staple supply. At the mixer, the resulting fluid mass is agitated to provide uniform dispersion of solids and the amount of liquid present is adjusted. The mixer feeds the head box of the Fourdrinier machine wherein the water leaf is laid down, progressing thereafter through the drier and finally to the product reel. Representative of the sheet-like product obtained by this process is the product illustrated in FIG. 5 of the drawings which is a photomicrograph magnified 100 times. It should be noted, in reference to FIG. 5, that the fibrets are entangling and interlocking with themselves and the staple fibers to create a physical bonding. The bonding effect is illustrated by the fact that similarly prepared nonwoven sheets made of staple fibers only contain substantially no tear strength.

Figure 3:
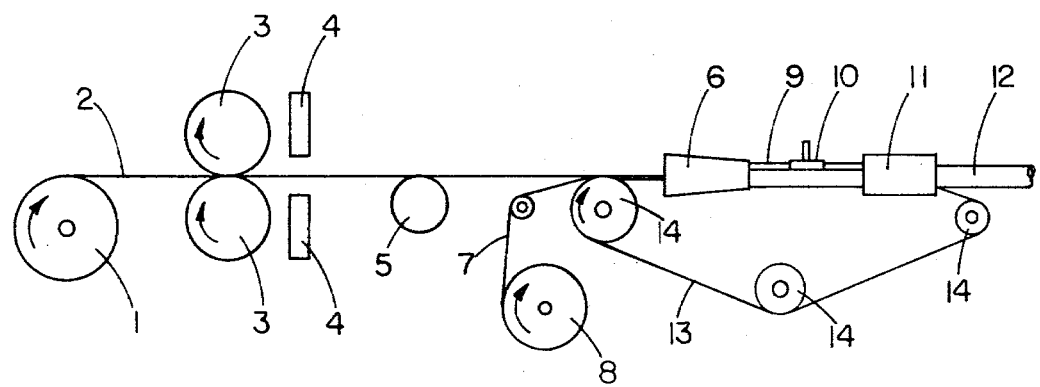
FIG. 3 is a vertical projection of an arrangement for crimping the sheet-like material of this invention and shaping the crimped material into a cylindrical filter rod.

The sheet-like product from the product reel is then processed by means of the arrangement shown in FIG. 3. A sheet-like web 2 cut to an appropriate width is passed from supply roll 1 into the nip of a pair of driven corrugating rolls 3, corrugating rolls 3 being designated such as to produce folds and grooves and partial tears longitudinal to the direction of travel of sheet-like web 2. Static eliminators 4 are positioned down stream of corrugating rolls 3 so as to inhibit the licking up of sheet-like web 2 on either of the corrugating rolls 3. The corrugated sheet-like material 2 is then passed over a crowned roll 5 and then into the inlet funnel 6 of a rod making machine together with wrapping strip 7 which is supplied by supply roll 8. The transversely gathered and longitudinally grooved sheet-like material cylindrically wrapped emerges from funnel 6, the proud edge 9 of which is supplied with an adhesive by means of applicator device 10, the glued rod then being passed through heated molding tool 11 so that a finished filter rod material 12 is formed. The entire rod making machine apparatus is conveniently driven by means of an endless conveyor belt 13 which is driven by means of drive rolls 14. The finished rod material 12 may then be conveniently divided into suitable lengths which may be subsequently cut into cigarette filter plugs.

As previously mentioned, the sheet-like material of this invention comprises a cohesive nonwoven web of cellulose ester staple fibers and from about 5 percent to about 35 percent of cellulose ester fibrets based on the weight of the finished sheet. It is preferred, however, that the filter material comprises from about 10 percent to 20 percent of the cellulose ester fibrets. It is also further preferred that both the staple and the fibrets be cellulose acetate. The filter material of this invention is further characterized by a surface area of between about 1 square meter per gram and about 5 square meters per gram, a porosity $\Delta P$ through a one inch diameter circular sheet of between about 1 mm and about 70 mm. at a flow rate of 200 cc per minute. It is preferred, however, that the filter material have a surface area of between about 2 square meters per gram and about 5 square meters per gram.

As previously noted, the fibrets used in the filter material of this invention may be produced by any of the known methods of the prior art such as the method disclosed in U.S. Pat. No. 3,342,921 and No. 3,441,473 which consists of air spraying a dilute dope of the cellulose ester into the atmosphere and then into a quench bath of water or the method disclosed in U.S. Pat. No. 2,988,469 wherein cellulose acetate dope is extruded in a high velocity, unidirectional, free flowing jet stream of gas to produce fibers without the formation of shot. The preparation of the fibrets for use in the filter material of this invention is preferably carried out in accordance with the teachings of the description of FIG. 1 of the drawings or in accordance with the teachings of U.S. application Ser. No. 638,242 filed Dec. 8, 1975, which provides a rotary spinning process comprising: (1) forming a cellulose ester dope, the dope preferably containing from 5 to 15 percent by weight cellulose ester, in a solvent containing from about 2 to 20 percent by weight of a non-solvent liquid which is miscible with the solvent for the cellulose ester and from about 80 to 98 percent by weight of a solvent for the cellulose ester which is miscible with the non-solvent; (2) passing the cellulose ester dope by any suitable means such as by pumping through a rotary union, to the extrusion orifice; (3) positioning a substantially cylindrical disk which is rotating about its axis in a heated precipitation bath, the bath consisting essentially of a non-solvent for the cellulose ester and up to 10 percent by weight of an organic solvent which is miscible with said non-solvent; (4) maintaining the precipitation bath at a temperature of from about 60 degrees centigrade to a temperature below the boiling point of the nonsolvent therein, preferably a temperature of up to 95 degrees centigrade; (5) pumping additional liquid corresponding substantially in composition with the composition of the precipitation bath into the precipitation bath and past the periphery of the rotating disk at a flow rate of at least 0.5 liter per minute per extrusion orifice, preferably at least 1.0 liter per minute per extrusion orifice; (6) extruding the dope through one or more orifice or capillary needles positioned on the periphery of the rotating disk, or alternatively, positioning a wall or plate around the periphery of the rotating disk and, optionally extruding the dope from orifices positioned on the wall or on the periphery of the disk into the precipitation bath, the extrusion orifice or orifices having a diameter ranging from 0.005 to 0.040 inch; (7) precipitating the cellulose ester dope in the precipitation bath and removing the precipitatate from the bath; (8) subjecting the fibret precipitate to boiling, preferably in water, for at least 5 minutes, preferably from 10 to 30 minutes, to aid in removing residual organic solvent, and to expand and set the voidy fibrillar structure; (9) homogenizing the fibrets and reducing the particle size of the cellulose ester fibrets; and (10) the cellulose ester fibrets may optionally be subjected to a drying operation to partially or totally dry the fibrets in preparation for the production of the filter material of this invention.

The dope formulation contains a cellulose ester such as cellulose acetate, cellulose triacetate, cellulose acetate butyrate, benzyl cellulose, or mixtures thereof. The preferred fibrets are produced from cellulose acetate dissolved in a solvent comprising two miscible components: an organic solvent such as acetone, methyl ethyl ketone, acetaldehyde or ethyl acetate and a liquid non-solvent for the cellulose ester such as water, methanol or ethanol. The liquid non-solvent makes up from about 2 to 20 percent by weight of the solvent mixture. The preferred organic solvent is acetone which is miscible with the preferred nonsolvent, which is water. The concentration of cellulose ester in the solvent mixture should be from about 5 to 15 percent by weight, preferably 5 to 8 percent. Below about a 5 percent cellulose ester level, the process is economically undesirable. Because the organic solvent flashes off during the process and can cause various problems relating to solvent recovery and the presence of a flammable, volatile solvent in the atmosphere, it is desirable to keep the organic solvent level as low as possible and still obtain the desired product. In addition, keeping the dope solids level relatively low provides a dope which also has a relatively low viscosity and is much easier to handle and extrude without significant clogging of the extrusion orifices. Mineral additives such as $TiO_2$, $BaSO_4$ and $Al_2O_3$ can be included in the dope solution if desired. If they are present, they may be included at levels up to 50 percent of the weight of acetate as part of the total solids in the dope and are ball milled to a fine particle size.

The cellulose esters of this invention are preferably prepared from an acetylation grade wood pulp with higher than 90 percent by weight of hemicellulose. However, it should be understood that lesser quality wood pulps are also acceptable; that is to say, wood pulps having a hemicellulose content of from 5 percent to 10 percent by weight. Correspondingly, it is preferred that high purity cellulose esters be employed. Purity is equated to filterability which represents the number of pounds of dissolved ester that can be filtered through a typical plant first filtration medium before the medium plugs to an undesirable extent. Values of from 30 to 60 lb.ft.$^2$ of filtering area are typical of commercial textile grade esters. However, cellulose esters having plugging valves of less than 30 lbs./ft.$^2$ are also suitable for purposes of the preparation of the fibrets for use herein. That is to say, the fibrets of this invention may be prepared from cellulose esters having a lesser degree of purity than that which is considered acceptable for filament-forming applications.

When fibrets for use in the filter material of this invention are made by the spray spinning process as set forth in the description of FIG. 1 of the drawings, high pressure water is preferably used as a spraying medium. By using water, a smooth running nonplugging spray process is achieved, and the dimensions of the precipitated product appear to be finer than that product obtained by following the teachings of U.S. patent application Ser. No. 638,242 filed Dec. 8, 1975. By changing water flow and temperature, the length of the fibrets can be altered. Cold water and/or high flow rates will minimize fibret length. The dope solution preferably consists of 10 percent solids dissolved in a 90 percent acetone, 10 percent water solvent. Solids concentrations between 5 percent and 12 percent can be utilized with higher concentrations giving a coarser stringy material and lower concentrations being economically undesirable. The solvent mixture can range from 100 percent acetone to 60 percent acetone, 40 percent water with little effect on the product properties. It should be understood, however, that any of the cellulose ester dope formulations which have previously been set forth as suitable for use in the process of U.S. application Ser. No. 638,242 filed Dec. 8, 1975, are also suitable for use in the spray spinning process set forth in the description of FIG. 1 of the drawings. Mineral tracers such as $TiO_2$, $BaSO_4$ and $Al_2O_3$ may also be included in the dope solutions if desired.

The preferred fibrets of this invention have an extremely large surface area per unit of weight. Whereas ordinary cellulose acetate filaments have a surface area of about 0.25 square meters per gram, the cellulose ester fibrets used in the production of the filter material of this invention have surface areas in the range of from about 12 to 25 square meters per gram in most instances, but substantially always have surface areas of greater than 5.0 square meters per gram.

As previously noted, cellulose ester staple fiber employed is desirably material of the conventional type having a fiber length of from about $\frac{1}{8}$ to $\frac{5}{8}$ inch and a denier per filament of from about 1.0 to 8.0. It is preferred that the staple have a length of from 0.25 to 0.375 inch and a denier per filament of from about 1.4 to 3.0. The fiber cross-section may be the normal crinulated form produced by extrusion through a round orifice or have other cross sections produced by extrusion through non-circular orifices, i.e., Y, X or dog bone cross-sections and the like. The cellulose ester staple may be one or more selected from the group of cellulose acetate, cellulose propionate, cellulose butyrate, cellulose benzoate, cellulose acetate formate, cellulose acetate propionate, cellulose acetate butyrate and the like. The esters may be ripened and acetone soluble, such as conventional cellulose acetate, or may be substantially fully esterified, i.e., contain fewer than 0.29 free hydroxyl groups per anhydroglucose unit, such as cellulose triacetate. The preferred cellulose ester staple is cellulose acetate.

As discussed in conjunction with FIG. 2 of the drawings, the sheet-like material of this invention may be prepared from a slurry formed of the cellulose ester staple fibers and the cellulose ester fibrets in water. Between 5 and 35 percent, and preferably between 10 and 20 percent, fibrets should be present based on the weight of fibrous material used. Solids should comprise between 0.005 and 0.1 percent, and preferably between 0.01 and 0.03 percent, of the slurry.

The staple fibers and fibrets should be thoroughly mixed and uniformly distributed throughout the slurry. This may be accomplished by stirring or mixing either manually or with any conventional mixing apparatus. The staple fibers and fibrets may be added individually to the water and blended. However, when the fibrets have been prepared utilizing water as the boiling medium to expand and set the voidy fibrillar structure, the fibret/water cake, with additional water if necessary, may be used as a base for the staple fiber/fibret/water slurry which, in this case, would be prepared merely by the addition of the appropriate amount of staple fibers to the fibret/water blend.

As previously mentioned, the slurry is deposited on conventional paper-making apparatus to form a sheet-like material which has utility as a filter material such as for instance in sheet form for use in face masks and respirators or in corrugated and condensed form for use as a cigarette filter. Cigarette filter rods produced from corrugated filter material of this invention exhibit equal or higher filtration efficiencies at a given pressure drop than rods of similarly corrugated paper webs with significantly improved taste.

The invention is further illustrated by the following examples wherein all parts and percentages are by weight and all temperatures are in degrees centigrade, unless otherwise specified.

EXAMPLE 1

To prepare the rotary spun fibers of the sheet-like material of this invention, a 7.5% solids dope formulation containing fiber grade cellulose acetate having an acetyl value of abot 55 is prepared according to the following formulation:

|  | Parts by Weight |
| --- | --- |
| Cellulose acetate flake | 90.5 |
| Acetone | 1080.0 |
| Water | 120.0 | by first mixing the acetone and water and then adding the acetate flake. The mixture is gently tumbled until the cellulose acetate is completely dissolved. 20 percent by weight of $TiO_2$ tracer material is then added based on the solids weight of the dope. Utilizing the apparatus disclosed in copending U.S. application Ser. No. 608,416, the dope is placed in a storage tank and then pumped through a conduit by a gear pump to a hollow shaft through a rotary union into the interior of a six inch hollow disk rotating at 2900 revolutions per minute (a peripheral speed of 1390 meters per minute). The disk is immersed in a precipitation bath for the dope which consisted essentially of water heated to a temperature between 75 and 85 degrees centigrade. The hollow rotating disk has three 0.014 inch diameter orifices on the peripheral surface of the disk. The disk rotates within an annular wall or ring spaced about 3/16 inch from its peripheral surface. Water maintained at a temperature between 75 and 85 degrees centigrade is pumped into the precipitation tank and passed through the annular space between the periphery of the disk and the wall at a flow rate of 6.7 liters/minute/orifice. Short, voidy fibers having a high degree of fibrillation are generated by the rapid precipitation of the cellulose acetate and the shear and high draw on the dope stream issuing from the extrusion orifices.

The material is then swept to the surface of the precipitation bath and overflows onto a collection screen where a portion of the water and acetone is separated from the fibrillar material. The collected material is then boiled for about 20 minutes at a pressure of 15 p.s.i.g. is remove residual solvents and harden the voidy structure. The fibrillar material is then redispersed in water and passed to a Gaulin 15 M homogenizer manufactured by Gaulin Corporation, Everett, Mass., where the fibret lengths are reduced at a pressure to 3000 p.s.i. to about 500 microns or less. The fibrillar material is then suction-filtered to provide a cake containing about 12 percent by weight cellulose acetate fibrets and 88 percent water. The fibrets as they are removed from the precipitation bath have a relatively limp structure and relatively short average fiber lengths. After homogenization and heat treatment, the fibrets are no longer limp but rather are set and with a somewhat expanded voidy structure. The fibrets are generally irregular in shape having a length varying from about 1 to about 500 microns and a diameter from less than 1 up to about 50 microns. The fibrets and ¼ inch staple of 1.8, 3.0, and 8.0 dpf (Y cross section) were formed into sheets on a laboratory nonwoven sheet-forming apparatus. The fibrets were then dispersed to 0.5 percent concentration in a Waring blender, and this slurry was further dispersed in 250 gallons of water containing 227 grams of staple. This slurry was pumped onto a 60×40 mesh brass screen moving at 5.5 feet per minute. Vacuum was applied to the screen (8–10 inches of mercury) to remove water and the formed sheet was transferred to a felt belt and finally to two steam drying cans containing steam at 20 and 30 pounds pressure. The finished 12 inch wide sheets were 0.0037 to 0.0038 inch thick and had properties as set forth in the following table designated as Table I:

TABLE I

| Staple dpf | Fibrets Added to Slurry | Sheet Weight g/m² | Percent Fibrets Finished Sheet | Breaking Strength g/5 cm strip |
|---|---|---|---|---|
| 1.8 | 101 g. | 37.3 | 16.5 | 300 |
| 3.0 | 216 g. | 33.0 | 17.6 | 459 |
| 8.0 | 309 g. | 32.1 | 20.1 | 755 |

Strips were cut from these sheets at widths indicated below and passed through heated corrugating rolls containing 25 teeth per inch with a surface temperature of approximately 120 degrees centigrade. The corrugated strips were gathered into a garniture and wrapped with paper to form filter rods of 90 mm length and 25 mm circumference. These rods were cut into 20 mm tips which were attached to 65 mm tobacco columns for measurement of the removal efficiency (% removed by filter) of total particulate matter (SRE), Nicotine alkaloids (NRE), and "tar" as defined by the Federal Trade Commission (TRE). The results were as set forth in the following table designated as Table II:

TABLE II

| Fiber dpf | Strip Width (inches) | 20 mm Tip Weight (mg.) | Avg. Tip Pressure Drop (mm H₂O) | Removal Efficiency at 60 mm PD | | |
|---|---|---|---|---|---|---|
| | | | | SRE | NRE | TRE |
| 1.8 | 7.5 | .118 | 43 | 68.0 | 65.7 | 64.9 |
| 3.0 | 9.0 | .167 | 62 | 62.1 | 58.8 | 57.2 |

TABLE II-continued

| Fiber dpf | Strip Width (inches) | 20 mm Tip Weight (mg.) | Avg. Tip Pressure Drop (mm H₂O) | Removal Efficiency at 60 mm PD | | |
|---|---|---|---|---|---|---|
| | | | | SRE | NRE | TRE |
| 8.0 | 10.0 | .204 | 70 | 62.5 | 56.7 | 57.5 |

The sheets containing low dpf fibers appear to be better on several counts. The retention of fibrets in the sheet-making process is improved, and a weaker, more readily corrugated sheet is formed. The resulting tip weights and pressure drops are reduced and, in the case of 1.8 dpf, a considerable increase in removal efficiency is achieved.

EXAMPLE 2

To prepare the spray spun fibrets of the filter material of this invention, the dope formulation of Example 1 is again employed. Utilizing a nozzle and cap spray apparatus as prepared by Spraying Systems Company Set-up #22B, 3201 Randolph Street, Bellwood, Ill., 60104, the dope is placed in a storage tank and then pumped through a centrally positioned 0.40 inch extrusion nozzle at a rate of 420 grams per minute. Precipitating and attenuating water at 60 to 65 degrees centigrade is pumped through the three orifices surrounding the extrusion nozzle at a rate of 9 to 10 liters per minute at a pressure of 180 pounds per square inch. The dope-water mixture exits through a 0.110 inch orifice located 0.140 inch away from the dope nozzle into a tube filled with water where the fibrets are precipitated. The fibrets are then collected and purified and formulated into paper by the same process as is set forth in Example 1, with the exception that the material was boiled at atmospheric pressure and homogenization was omitted.

EXAMPLE 3

The process of Example 2 was repeated with the exception that the spray spun fibret material was subjected to an atmospheric boiling operation and then passed through a Gaulin homogenizer.

EXAMPLE 4

The process of Example 2 was repeated with the exception that the spray spun material was boiled under pressure at 120 degrees centigrade and then subjected to homogenization by passage through a Gaulin homogenizer.

The samples from Examples 2, 3 and 4 were formulated into sheet-like webs and evaluated in the following table designated as Table III:

TABLE III

| Treatment | Sheet Wt. g/m² | % Fibrets | ** Breaking Strength g/5 cm | Tip Wt. (g) | Smoke Removal Efficiency at 50 mm PD* |
|---|---|---|---|---|---|
| Example 2 | 32.1 | 24.3 | 1300 | .181 | 54 |
| Example 3 | 37.1 | 16.0 | 1300 | .182 | 55 |
| Example 4 | 32.1 | 23.6 | 1018 | .195 | 58 |

*interpolated or extrapolated from data at higher and lower pressure drops
**The high sheet strengths resulted from higher temperature drying with steam can pressures of 35 and 45 p.s.i.

As can be interpreted from the data of Table III, boiling under pressure and homogenization provide a finer material which gives a weaker, more readily corrugated sheet, which in turn improves the smoke removal efficiency at a given pressure drop.

In order to determine the effect of a fibret level in a sheet-like material produced according to the teachings of this invention, samples of the rotary spun fibrets of Example 1 and the spray spun fibrets of Example 4 were combined with staple and wood pulp fibers to form sheets containing between 5 and 100 percent fibrets. The pertinent data is reported in the following table designated as Table IV:

TABLE IV

| Fibret Level (%) | Staple (dpf × length(in)) | Spinning Technique | Sheet Strength (g/5 cm) | Tip Wt. (g) | Tip P.D. (mm H$_2$O) | Removal Efficiencies SRE | NRE | TRE |
|---|---|---|---|---|---|---|---|---|
| 5* | 1.8 × ¼ | Spray | 182 | .115 | 60 | 71.1 | 63.7 | 68.0 |
| 11.9 | 3.0 × ¼ | Rotary | 228 | .121 | 58 | 62.2 | 60.0 | 59.5 |
| 15.8 | 3.0 × ¼ | Rotary | 354 | .119 | 58 | 62.6 | 59.7 | 59.8 |
| 17.6 | 3.0 × ¼ | Rotary | 459 | .160 | 60 | 62.1 | 58.8 | 57.2 |
| 23.1 | 3.0 × ¼ | Rotary | 505 | .127 | 60 | 62.0 | 61.1 | 59.5 |
| 27.7 | 1.8 × ¼ | Rotary | 771 | .124 | 60 | 63.0 | 57.5 | 61.4 |
| 30* | 1.8 × ¼ | Spray | 767 | .114 | 60 | 58.3 | 50.9 | 51.3 |
| 50* | + | Rotary | — | .168 | 56 | 54.2 | 50.0 | 49.0 |
| 75* | + | Rotary | — | .222 | 60 | 43.2 | 32.3 | 37.8 |
| 100* | — | Rotary | — | .230 | 56 | 37.2 | 27.2 | 29.5 |

*prepared on Noble and Woods hand sheet apparatus, fibret levels estimated from fibret concentration in slurry and retention on the forming screen
+wood pulp substituted for staple As can be seen from Table IV, the data illustrates that fibret level is correlated with sheet strength but does not greatly affect the smoke removal efficiencies at levels below 30 percent. When fibrets are present at levels of 30 percent or more, the sheet strength is sufficiently high that the corrugation process does not open the structure up sufficiently to make a good filter. Consequently, there is a progressive loss in removal efficiency as the fibret level increases above 30 percent. There is also a pattern of increasing tip weight as the fibret level increases, which would make high levels undesirable from an economic viewpoint. At the low fibret level of 5 percent, the smoke removal efficiency values are high, partially because of the lower denier per filament staple utilized and partially because of the openness of the corrugated sheet. The sheet strength is quite low and the material is difficult to handle in sheet and rod making because of this.

EXAMPLE 5

3 denier per filament ¼ inch cellulose acetate staple was employed together with the cellulose acetate fibrets of Example 4 to prepare a sheet-like material. A 12 inch width laboratory fourdrinier machine having a 90×100 mesh screen was used and the drying conditions were such that unglazed sheets were obtained (10 pounds per square inch stream can pressures on dryer rolls). The sheet-like material produced was then converted into cigarette filters according to the method set forth in the description of FIG. 3 of the drawings. The data from this example is set forth in the following table designated as Table V:

TABLE V

| Sheet Wt. (g/m$^2$) | Fibrets (%) | Breaking Strength (g/5 cm) | Pressure Drop (mm H$_2$O) | Tip Wt. (g) | Removal Efficiency SRE (%) | NRE (%) | TRE (%) |
|---|---|---|---|---|---|---|---|
| 20.0 | 13.6 | 100 | 39.5 | .126 | 54.8 | 50.0 | 53.1 |
| 35.5 | 11.9 | 228 | 40.5 | .116 | 57.2 | 51.5 | 54.0 |
| 41.1 | 13.2 | 325 | 40 | .139 | 56.6 | 50.0 | 52.0 |

EXAMPLE 6

1.8 denier per filament, ¼ inch cellulose acetate staple was employed together with the cellulose acetate fibrets of Example 4 to prepare a sheet-like material. The staple and fibret levels in the initial slurry were reduced to 113 and 32 grams per 250 gallons of water respectively. A 12 inch width laboratory fourdrinier machine having a 90×100 mesh screen was used and the drying conditions were such that unglazed sheets were obtained (10 pounds per square inch steam can pressures on dryer rolls). The data from this example is set forth in the following table designated as Table VI:

TABLE VI

| Sheet Wt. (g/m$^2$) | Fibrets (%) | Avg. Tip Wt. (g) | Avg. Pressure Drop (mm H$_2$O) | Removal Efficiency at 60 mm P.D. SRE | NRE | TRE |
|---|---|---|---|---|---|---|
| 26.8 | 17.3 | .148 | 52 | 71.0 | 66.5 | 68.4 |
| 37.3 | 16.5 | .118 | 43 | 68.0 | 65.7 | 64.9 |

The data from Tables V and VI indicate that there is an optimum sheet weight for filters produced from these sheet-like materials in the region of 26 to 36 grams per square meter. It should be understood of course that optimum sheet weight will vary depending on other physical parameters of the sheet.

In order to determine the efficiency of the cigarette filter rod produced from the sheet-like web of the instant invention in comparison with filter rod materials of the prior art, a sheet-like web was prepared according to the following example designated as Example 7:

EXAMPLE 7

The process of Example 6 was repeated employing sufficient fibrets to produce a sheet containing 17.3% fibrets and a sheet weight of 26.8 grams per square meter. The sheet was then corrugated in the longitudinal direction and hand rolled into a cigarette filter. The filter was then evaluated against commercially available filters. The pertinent data is set forth in the following table designated as Table VII:

TABLE VII

| Filter Construction | Pressure Drop (mm H$_2$O) | Filter Wt. (g) | Smoke Removal Efficiency (%) |
|---|---|---|---|
| Acetate tow, 1.8 dpf, 43000 total denier | 80 | .116 | 56.5 |
| Acetate tow, 3.3 dpf, 44000 T.D. | 77 | .138 | 53.0 |

TABLE VII-continued

| Filter Construction | Pressure Drop (mm H₂O) | Filter Wt. (g) | Smoke Removal Efficiency (%) |
|---|---|---|---|
| Corrugated cellulose paper | 80 | .208 | 70.7 |
| Corrugated acetate non-woven (17.3% fibrets) | 80 | .158 | 77.6 |

As can be seen from the data of Table VII, it is evident that the corrugated acetate sheet-like material has superior smoke removal performance to other structures and hence is the preferred construction. Where, nowever, for various reasons, such as smokers' preference, it is desired to alter the fabrication of the filter or reduce its filtration efficiency, the sheet-like material may be shredded or needle punched rather than corrugated prior to being rolled into a filter. Alternatively, wood pulp may be blended into the cellulose fibret and cellulose staple mix employed in the preparation of the sheet-like material of this invention. In order to domonstrate the aforementioned reduction in filter efficiency, the sheet-like material of Example VII was needle punched prior to hand rolling, shredded prior to hand rolling and adulterated with wood pulp, the pertinent data being as set forth in the following table designated as Table VIII:

TABLE VIII

| Filter Construction | Pressure Drop (mm H₂O) | Filter Wt., (g) | Smoke Removal Efficiency |
|---|---|---|---|
| Needle punched acetate non-woven | 81 | .126 | 69.5 |
| Shredded acetate non-woven corrugated | 81 | .138 | 67.0 |
| 1.8 dpf acetate-wood pulp (17.5%) non-woven | 80 | .147 | 66.0 |

The most preferred means for adjusting the smoke removal efficiency of the sheet-like material of this invention is layering of the corrugated sheet-like material with cellulose acetate tow prior to forming filter rods. The preparation of such layered filters is fully set forth in U.S. Pat. No. 3,396,061. However, it is preferred to simultaneously corrugate the layered structure. When, for instance, the corrugated sheet-like material of Example VII is layered and simultaneously corrugated with 3.3 denier per filament cellulose acetate tow on a 50/50 weight bases, it is found that a cigarette filter weighing 0.154 grams having a pressure drop of 78 mm H₂O will produce a smoke removal efficiency of 65.9%.

To test the performance of fibret-staple non-wovens in sheet filtration applications, sample sheets were prepared according to the process set forth in Example 1 except that hand sheet forming apparatus (Nobel and Woods) was employed. Acetate and polyester staple containing various levels of fibrets was employed in making the sheets. These were cut into 1¾ diameter disks and mounted in Cambridge filter pad holders to test their removal efficiency for tobacco smoke, which is considered in this instance to be a representative aerosol in the 0.1–1.0 particle size range. Two types of samples were prepared, one of which consisted of normal thin sheets (0.1–0.2 mm thick) and the other of thick sheets (1.4–1.6 mm thick), which approximately matched the pressure drop of commercial face mask filtering material. In the case of the thin sheets pressure drop comparisons were made by stacking sheets in the Cambridge pad holders. The commercial materials used for comparison purposes consisted of disks cut out of face mask materials. One consisted of a BM 2166 dust and mist respirator pad made by the Mine Safety Appliances Co. of Pittsburg, Pa., and the other a bonded fibrous material used as a molded face mask labelled TC-21C-132 (No. 8710) manufactured by the Minnesota Mining and Manufacturing Co. of Minneapolis, Minn. The results are as given in the following table designated as Table IX:

TABLE IX

| Pad Material | No. Pads | Staple dpf & length(in) | % Fibrets | Pad wt. (g) | Pad pressure drop (mm H₂O) | Pad Smoke Removal Efficiency % |
|---|---|---|---|---|---|---|
| thick acetate non-woven | 1 | 8.0 × ¼ | 5 | .890 | 7 | 70.9 |
| thick acetate non-woven | 1 | 33 × ¼ | 5 | .780 | 11 | 79.2 |
| thick acetate non-woven | 1 | 3.3 × ¼ | 5 | .802 | 12 | 85.8 |
| thin acetate non-woven | 1 | 1.8 × ¼ | 10 | .091 | 3 | 31.7 |
| thin acetate non-woven | 3 | 1.8 × ¼ | 10 | .324 | 8 | 62.9 |
| polyester staple + | 1 | 1.5 × ¼ | 10 | .126 | 2 | 30.4 |
| fibret non-woven | 5 | 1.5 × ¼ | 10 | .626 | 6 | 77.4 |
| BM 2166, #1 | 1 | — | — | .687 | 3 | 39.5 |
| BM 2166, #1 0.3 | 1 | — | — | .695 | 3 | |
| BM 2166, #2 | — | — | 695 | 7 | 44.8 | |
| BM 2166, #2 | 1 | — | — | .712 | 9 | 43.3 |
| 7C-21C-132 | 1 | — | — | .400 | 7 | 74.6 |
| TC-21C-132 | 1 | — | — | .400 | 9 | 68.8 |

It is evident that the staple non-wovens are effective in removing tobacco smoke particles in both the tick and multiple thin pad configurations. The non-woven pads of this invention are found to have equal or greater efficiency than prior art materials in the high pressure drop range.

Having thus disclosed the invention, what is claimed is:

1. As a tobacco smoke filter precursor, a corrugated binder-free non-woven fibrous cellulose ester sheet-like material, comprising from about 65% to about 95% cellulose ester staple fibers and from about 5% to about 35% precipitated cellulose ester fibrets, said fibrets having a surface area of from 12 to 25 square meters per gram and lengths of less than 1000 microns, said sheet-like material having a sheet weight of from 20 to 40 grams per square meter, a surface area in excess of 1 square meter per gram, a sheet breaking strength of from 200 to 1000 g/5 cm. and a porosity through a 1 inch diameter circular sheet of said non-woven fibrous cellulose ester material of between about 1 millimeter and 70 millimeters at a flow rate of 200 cc. per minute.

2. The filter sheet-like material of claim 1 wherein the fibrets comprise cellulose acetate.

3. The filter sheet-like material of claim 1 comprising from about 10% to about 25% cellulose ester fibrets.

4. The filter sheet-like material of claim 1 wherein the cellulose ester staple fiber is selected from the group consisting of cellulose acetate, cellulose propionate, cellulose butyrate, cellulose benzoate, cellulose acetate formate, cellulose acetate propionate, cellulose acetate butyrate, and mixtures thereof.

5. The filter sheet-like material of claim 1 wherein the cellulose ester staple fiber comprises cellulose acetate.

6. A method of producing a self-supporting, non-woven, binder-free cellulose ester fibrous tobacco smoke filter precursor corrugated sheet-like material which comprises preparing a slurry of cellulose ester staple fibers and cellulose ester fibrets in water, said fibrets being precipitated fibrets having a surface area of from 12 to 25 square meters per gram and lengths of less than 1000 microns, mixing the slurry to produce a homogenous mixture of staple fibers and fibrets, depositing the slurry on a porous surface which permits the drainage of water from the deposited fibrous structure, drying the fibrous structure, removing the thus-formed sheet-like material from the porous surface, and then corrugating the sheet-like material whereby a corrugated sheet-like material is obtained having a sheet weight of from 20 to 40 grams per square meter, a surface area in excess of 1 square meter per gram, a sheet breaking strength of from 200 to 1000 g/5 cm. and a porosity through a 1 inch diameter circular sheet of said material or between about 1 millimeter and 70 millimeters at a flow rate of 200 cc. per minute.

7. The method of claim 6 wherein the aqueous slurry contains fibrous material comprising from about 65 percent to about 95 percent cellulose ester staple fiber and from about 5 percent to about 35 percent cellulose ester fibrets.

8. The method of claim 6 wherein the cellulose ester staple fibers have a denier per filament of from about 1.05 to about 8.0 and a length of from ⅛ inch to about ⅝ inch.

9. The filter sheet-like material of claim 1 wherein said surface area is between about 2 square meters per gram and about 5 square meters per gram.

* * * * *

UNITED STATES PATENT OFFICE
CERTIFICATE OF CORRECTION

Patent No. 4,274,914          Dated June 23, 1981

Inventor(s) Charles H. Keith and Richard O. Tucker

It is certified that error appears in the above-identified patent and that said Letters Patent are hereby corrected as shown below:

Column 8, line 36, correct the word "abot" to read --about--.

Column 14, after line 30, please correct the "TABLE IX" to read as follows:

UNITED STATES PATENT OFFICE
CERTIFICATE OF CORRECTION

Patent No. 4,274,914     Dated June 23, 1981

Inventor(s) Charles H. Keith and Richard O. Tucker

It is certified that error appears in the above-identified patent and that said Letters Patent are hereby corrected as shown below:

TABLE IX

| Pad Material | No. Pads | Staple dpf & length (in.) | % Fibrets | Pad wt. (g) | Pad pressure drop (mm $H_2O$) | Pad Smoke Removal Efficiency % |
|---|---|---|---|---|---|---|
| Thick acetate non-woven | 1 | 8.0 x 1/4 | 5 | .890 | 7 | 70.9 |
| "      "      " | 1 | 3.3 x 1/4 | 5 | .780 | 11 | 79.2 |
| "      "      " | 1 | 3.3 x 1/4 | 5 | .802 | 12 | 85.8 |
| thin   "      " | 1 | 1.8 x 1/4 | 10 | .091 | 3 | 31.7 |
| "      "      " | 3 | 1.8 x 1/4 | 10 | .324 | 8 | 62.9 |
| polyester staple + fibret non-woven | 1 | 1.5 x 1/4 | 10 | .126 | 2 | 30.4 |
| | 5 | 1.5 x 1/4 | 10 | .626 | 6 | 77.4 |
| BM 2166, #1 | 1 | – | – | .687 | 3 | 39.5 |
| "       #1 | 1 | – | – | .695 | 3 | 40.3 |
| "       #2 | 1 | – | – | .695 | 7 | 44.8 |
| "       #2 | 1 | – | – | .712 | 9 | 43.3 |
| 7C-21C-132 | 1 | – | – | .400 | 7 | 74.6 |
| " | 1 | – | – | .400 | 9 | 68.8 |

Signed and Sealed this

Eighteenth Day of May 1982

[SEAL]

Attest:

Attesting Officer

GERALD J. MOSSINGHOFF
Commissioner of Patents and Trademarks